United States Patent [19]
Low

[11] 3,803,805
[45] Apr. 16, 1974

[54] PROCESS FOR CONTACTING A GAS WITH A LIQUID

[75] Inventor: David N. Low, Wilmington, Del.

[73] Assignee: E. I. du Pont de Nemours and Company, Wilmington, Del.

[22] Filed: July 17, 1972

[21] Appl. No.: 272,648

Related U.S. Application Data
[63] Continuation-in-part of Ser. No. 141,623, May 10, 1971, abandoned.

[52] U.S. Cl............................ 55/73, 55/84, 261/117
[51] Int. Cl.............................................. B01d 47/00
[58] Field of Search............ 55/73, 90, 220, 223, 84; 261/114, 117, DIG. 9, 19, 54

[56] References Cited
UNITED STATES PATENTS
1,980,522  11/1934  Hawley........................... 261/DIG. 9
3,480,386  11/1969  McMahon............................. 23/117
3,601,374  8/1971  Wheeler............................. 261/117
2,284,317  5/1942  Greenberg...................... 261/117 X Primary Examiner—Samih N. Zaharna
Assistant Examiner—Richard W. Burks

[57] ABSTRACT

A method is provided for effecting contact of a gas with a liquid by contacting the gas while flowing through a conduit by at least one jet of liquid flowing countercurrently to the gas. The average velocity of the gas through the conduit is maintained at a value of at least 1,000 feet per minute and at no less than flooding velocity. The velocity of liquid from the jet is sufficient to furnish greater than 1.0 jet horsepower per square foot of cross-sectional area of said conduit. The method may be used for scrubbing gases, absorption of materials from gases, or numerous other uses.

7 Claims, 5 Drawing Figures

INVENTOR
DAVID N. LOW

BY Donald A. Hoes
ATTORNEY

INVENTOR
DAVID N. LOW

PROCESS FOR CONTACTING A GAS WITH A LIQUID

CROSS REFERENCE TO RELATED APPLICATION

The present application is a continuation-in-part of application Ser. No. 141,623 filed May 10, 1971, and now abandoned. BACKGROUND OF THE INVENTION The need for economical methods for effecitvely removing particulate liquids and solids (mists and dusts) from process gas streams prior to discharge into the atmosphere is becoming increasingly important. Commercial equipment thus far developed for removing such particulate material from gas streams has been based on certain physical principles. Cyclones involve centrifugal separation, usually of suspended solids. Filters, of which bag filters are the most common, depend on impingement of the particles against each other or against solid surfaces. Impingement of the particles on liquid droplets is the basis of jet, venturi, plate or packed scrubbers. Electrostatic precipitators induce surface charges on the particles and collect the charged particles on oppositely charged electrodes. Each of these methods has certain advantages and disadvantages depending on the type and particle size of the material to be removed from the gas stream.

In general, the difficulty and cost of particulate material removal increases with decreasing particle size and decreasing loading. Particles below 10 microns in diameter and concentrations below 20 gms/$M^3$ are particularly difficult to remove. Unfortunately, gaseous suspensions of this type are characteristic of a number of industrial discharges that are considered to be biologically and esthetically unacceptable. Removal of this type particulate material to acceptable limits can be accomplished in many instances by refinement of the known methods but often times only at the cost of unacceptably high pressure drops in the system which are uneconomical with respect to increased power costs in moving gases through the process and more stringent demands on process equipment design. Low concentrations of particulate material contribute to poor efficiencies where particle-growth techniques such as ultrasonic agglomeration or steam injection are used to improve collection efficiencies.

SUMMARY OF THE INVENTION

This invention relates to an improved process for effecting contact of a gas with a liquid, e.g., for scrubbing entrained solids and liquids from the gas, by contacting the gas while flowing through a conduit by at least one jet of the liquid flowing countercurrently to the gas. Essential features of this process are that the rate of gas flow through the conduit be such as to provide an average velocity of at least 1,000 feet per minute and at no less than flooding velocity. Also the velocity of liquid through the jet should be sufficient to furnish more than one jet horsepower per square foot of cross-sectional area of the conduit.

It will be understood that the term "flooding velocity" as used herein connotes the well-known phenomenon which occurs when the gas velocity is sufficient to hold up liquid in an open pipe, e.g., see U.S. Pat. No. 3,350,075. Such flooding velocities will typically occur at gas velocities on the order of about 1,000 to 2,000 feet per minute but the actual value can depend upon the particular gases and liquids involved. In the case of the gas/liquid systems illustrated in the working examples hereinafter, it has been found by experimentation that flooding velocity occurs at about 1,500 feet per minute. In any case, it is essential to the practice of the invention that such flooding velocity be equaled or exceeded in order that the liquid issuing from the jet will reverse direction, hence the term "reverse-jet" is used throughout this specification.

The above-described reverse-jet process is advantageously utilized as a scrubbing means to control industrial discharges and while for some purposes it can be used alone, it can also be operated in conjunction with known gas treating procedures. In the latter regard, and in a preferred embodiment of the invention, the process will be described on the basis of its utilization in a system for removal of particulate material from the gaseous discharge product resulting from the manufacture of titanium dioxide by the sulfate process.

In any event, and as will be apparent from the detailed description hereinafter, the reverse-jet process has been found to be highly effective in the scrubbing of particulate material from a gas. This is due, apparently, to the extremely high degree of turbulence which results as the oppositely moving liquid and gas come together and the liquid is forced to reverse direction, i.e., turn back in the direction of the gas. The high degree of turbulence provides for extremely efficient contact of liquid, e.g., scrubbing liquid, with particulate material. The particulate material is thus occluded and carried along with the liquid, e.g., to a settling tank, while the cleansed gas is discharged to the atmosphere.

The key feature of the reverse-jet process of the invention resides in its efficiency, i.e. the horsepower is being put into a scrubbing action at a relatively low pressure drop. To accomplish a similar scrubbing effect by mechanically increasing the gas flow rate, i.e. by means of blowers pulling through a venturi throat, would involve much greater cost.

A significant advantage of the reverse-jet process of the invention, particularly in comparison with the venturi or orifice scrubbers of the prior art, is its ability to accommodate a high turn-down ratio without adjustments or moving parts.

While the invention is to be described particularly with reference to the scrubbing of gaseous materials, it is to be understood that it is also useful in the absorption of materials, e.g., $SO_2$, from gases into liquids or for reaching an equilibrium temperature between a gas and a liquid.

Still another advantage of the reverse-jet process of the invention is that it provides a simple means for regulating the pressure drop of a non-condensable gas flowing through a conduit. It will be understood that this can be of significant benefit in systems where wide fluctuations in gas flow rate are being encountered.

DRAWINGS

The invention will be described with reference to the drawings wherein.

Figure 5:
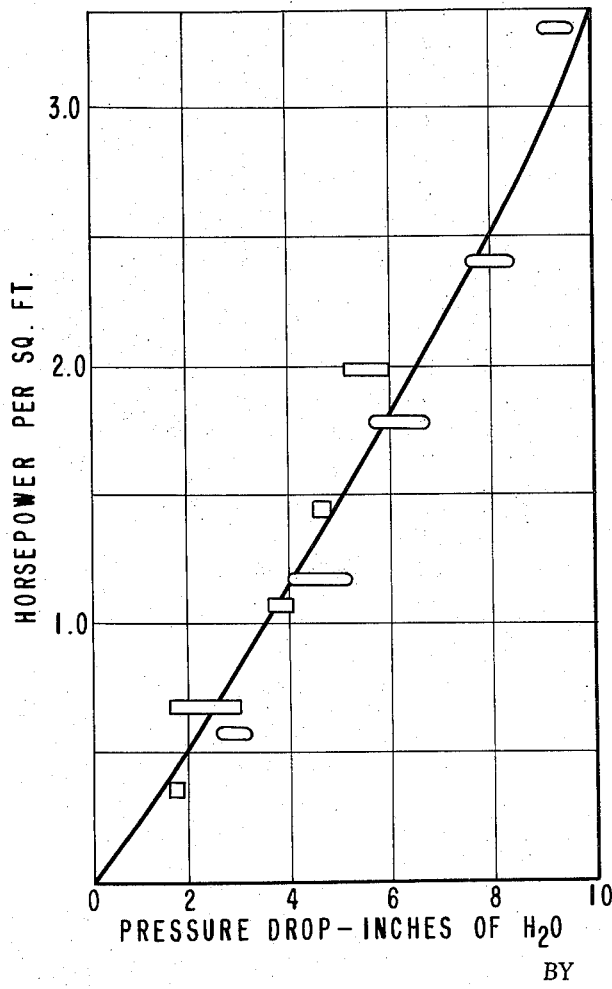

FIG. 5 graphically illustrates the experimentally determined relationship between horsepower per square foot and pressure drop.

DETAILED DESCRIPTION OF THE INVENTION

The reverse-jet process of the invention will be described by reference to FIG. 1 which illustrates its use in the manufacture of titanium dioxide via the sulfate process. It is to be understood that all of the elements of the depicted system, except for design and operation of the reverse-jet scrubber, represent conventional practice in the art. Nevertheless a general description of the sulfate process will first be given by way of background.

In the first step of processing ilmenite ore for the purpose of extracting and purifying the titanium dioxide contained therein, a quantity of sulfuric acid, e.g. of 78% by weight, is pumped to attack vessel 10 in sufficient quantity to wet the subsequently added charge of ore. The ilmenite ore consists of a distribution of particles, some 95% of which are advantageously less than 325 mesh (U.S. Standard Sieve measurement) or about 44 microns. During the addition of this ore to vessel 10, an appreciable amount of ore fines becomes suspended in the air space above the acid, and must be removed or direct passage to the atmosphere will occur via fume stack 11. After the addition of ore, it is usual practice for sufficient 103% by weight oleum to be added to give a 60% by weight stoichiometric excess of sulfuric acid in the charge (based upon the reactive metal content of the ore). Heat of hydration generated by the reaction of the oleum and dilute sulfuric acid added previously is usually sufficient to raise the temperature to 100°-110°C. whereupon the reaction between the ore and sulfuric acid commences. Once initiated the reaction proceeds exothermally and vigorously, throwing large amounts of ore dust, acid mist and steam into the air space in attack vessel 10 as well as into the fume stack 11.

Air from the atmosphere is pulled into fume stack 11 by centrifugal blower 12, and carries the particulates generated in the attack vessel into scrubber 13. During ore addition, when the particulate load consists principally of ore fines, the contaminated air stream is contacted with a water spray from nozzle 14, the water and moisture-laden air then passing to an air-liquid separating tank 21, where water and occluded ore fines fall out and are drawn off through line 16. The scrubbed air then passes to the atmosphere through the blower stack 18.

During reaction of the ore and acid the particulate load, including ore dust and acid mist, is greatly increased and a large amount of steam is also generated. To cope with this a large flow of water is dropped from quench tank 20 into the scrubber 13. During the period when the steam is being condensed, the particulate matter is very efficiently carried along therewith into the liquid phase. The quench system is activated by a thermocouple 22 situated in the lower part of the fume stack 11, which senses the onset of reaction by the temperature rise and actuates, by means of control unit 24, a drop valve 25 on the bottom of the quench tank 20 to thereby release the quench water into scrubber 13. At the same time the valve 28 may be actuated to discontinue the supply of water to nozzle 14.

As regards, now, the details (shown more fully in FIG. 2) of the reverse-jet scrubbing process, the liquid, in this case water, is being discharged from nozzle 14 in a direction substantially countercurrent to the incoming flow of gases. With the rate of gas flow through outlet pipe 15 having an average velocity of at least 1,000 feet per minute and at least at flooding velocity and the velocity of scrubbing liquid through nozzle 14 being sufficient to furnish more than one jet horsepower per square foot of cross-sectional area, a zone of intense turbulence 26 is created.

By way of further explanation, it is noted that the reverse-jet scrubber was proposed in order to remedy the problem encountered with an existing scrubbing system on the basis that the water jet acting countercurrently to the main flow of gas and then, in being forced to reverse direction, might utilize more of the kinetic energy of the system to reduce the sizes of the water drops and by thus increasing the total surface area of the water drops, increase the probability of collision with ore particles.

To explore these possibilities the characteristics of a reverse-jet were investigated on small scale equipment. The top of a vertically mounted glass tube was connected to a metered air supply. A precalibrated water nozzle (Spray Systems - ⅛ inch NPT GG 3004) was placed concentrically at the bottom opening of the glass tube and pointing countercurrently to the air flow with the nozzle tip extending only one-half inch into the tube so that the nozzle hardware did not contribute significantly to the pressure drop of the system. A Pitot tube was placed upstream of the nozzle for static pressure measurements and a pressure gauge was provided to show nozzle pressure and to monitor the water flow through the nozzle. A series of tests was made using both ¾ inch I.D. and 31/32 inch I.D. glass tubes in which both water rates to the nozzle and air flows to the tube were varied systematically. For each set of conditions (including air flow but no water flow) the system pressure drop was measured and the pressure drop when no water was flowing was subtracted to obtain the net pressure drop across the jet. The air flows were varied between 1,500 and 4,000 ft./minute and the water rates from 13.4 to 93 gallons/minute/1,000 ft.³air/minute.

These tests established that the volume rate of water flow per volume of air flow was not a controlling factor in determining the pressure drop across the countercurrent jet. If the jet water flow and velocities are calculated as jet horsepower, it is evident from data that the pressure drop is almost a direct function of the jet horsepower per unit cross-sectional area of the air duct or tube. The latter quantity is calculated from the relationship jet $HP/Ft^2 = [lbs./sec.(V^2/2g)]/550\ A$ where:
  lbs./sec. = water rate from jet
  $V$ = jet velocity in ft./sec.
  $g = 32.2$ ft./sec.$^2$
  $A$ = duct cross-sectional area in ft$^2$ (at the center of the turbulent zone created by intermingling of gas and water)

The data plotted in FIG. 5 includes that using both the 31/32 inch tube (rectangular points) and the ¾ inch tube (oval points) and demonstrates that the pressure drop added to the system by the reverse-jet is an almost direct function of the jet horsepower which it provides. The lengths of the respective marks on the graph (FIG. 5) represent the variation in pressure drop over the range of air velocities investigated (1,500–4,000 ft./min.). Utilizing the data of FIG. 5 it is thus entirely practical for one with a given water source to readily design a scrubbing arrangement to accomplish a predetermined pressure drop.

The above experiment reveals that aside from the removal of particulates from gas streams the reverse-jet process has two other significant advantages. It can be used in a gas flow system to maintain a relatively constant pressure drop in the system over widely varying flow rates with no moving parts in the gas stream. To achieve this, the cross-section of the conduit would advantageously be constant, as in FIG. 2, rather than with a restricted throat as in FIG. 3, since the principal advantage of the method would apply to systems where the pressure drop is small compared to that across the reverse jet. For example, a gas flow system designed for one-half inch of water pressure drop at a given gas flow without the jet and 7 ½ inches with the reverse jet operating would increase to only 9 inches of water if the gas flow rate is doubled. If a system without a reverse jet is designed for 7 inch pressure drop, a doubling of the flow rate will increase the pressure drop to 28 inches of water.

Figure 3:
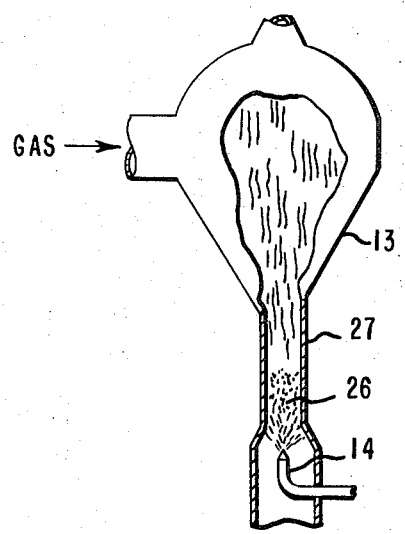
FIG. 3 is a schematic illustration of an alternative reverse-jet scrubber with a venturi type restriction added, for example where necessary to achieve a minimum 1,000 feet/minute gas velocity.
Figure 4:
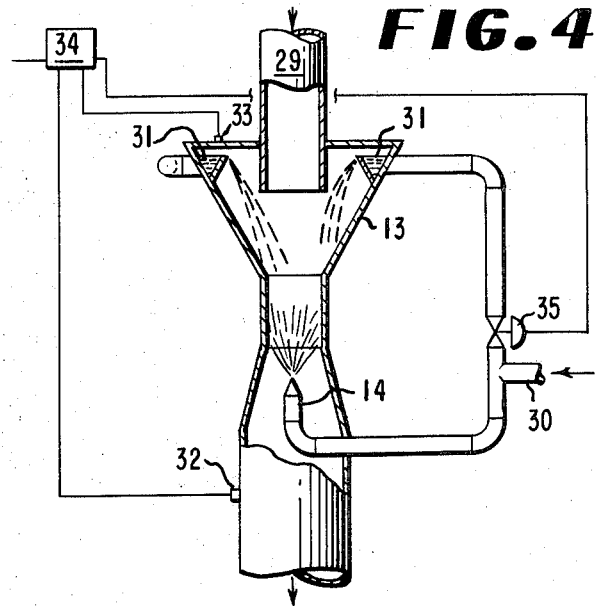
FIG. 4 shows in schematic form a modified reverse-jet scrubber arrangement for maintaining a constant pressure drop.

The method of the invention can also be used to control flow rate and pressure drop in a gas flow system. For example, the gas flow rate through systems shown in FIGS. 2 and 3 can be controlled to a desired value by adjusting the water flow to the jet. Pressure drop across the zone of turbulence will be a function of the horsepower of the jet, regardless of requirements for scrubbing or contacting the gas stream with the liquid. One form of such an arrangement is shown in FIG. 4. In this case dirty gas enters through line 29. Also a constant total flow of water enters the system at line 30 from a pump, not shown, and passes to the scrubber both through nozzle 14 and overflow 31. A pair of pressure sensors 32 and 33 signal any change in pressure drop to control unit 34 which then actuates automatic valve 35. If for example the pressure differential falls below an established value, valve 35 moves toward a closed position thereby forcing more water to nozzle 14 and thus increasing the pressure drop. In this way the regulation of the flow to the jet maintains a constant pressure drop in spite of a varying gas flow rate. It will be apparent that in the same way a constant pressure drop can be maintained even with varying water supply pressures.

Experiments have shown that substantially all of the energy of the reverse jet is utilized for scrubbing. Because of this high transfer of energy per unit of pressure drop, the reverse jet shows scrubbing efficiencies equal to much more elaborate devices developing much higher pressure drops. In the particular examples cited hereinafter, the use of the countercurrent jet can result in costs that may be considerably less than the cost of additional equipment that might otherwise be necessary to improve particulate removal to acceptable levels.

The process of the invention is operated utilizing a scrubbing liquid which is being jetted at a velocity of at least 1.0, and preferably at least 1.5, jet horsepower per square foot of cross-sectional area of the conduit. The efficiency of particulate removal tends to increase with increasing HP/ft$^2$ to a practical limit where a further increase of HP/ft$^2$ results in only a marginal increase in scrubbing efficiency. While for many systems some liquid/gas contact could doubtlessly be achieved by operating at less than 1.0 jet horsepower per square foot, little or no scrubbing of the gas would occur.

The effect of gas velocity on particulate removal is not great but gas velocities of at least 1,000 ft./min., preferably at least 1,500 ft./min., and in any case at no less than flooding velocity, are desired to avoid jet instabilities.

The geometry of the water jet as it issues from the nozzle and the exact orientation of the nozzle with respect to the scrubber duct are not critical. Maximum energy transfer from the jet to the air stream and minimum loss to the conduit wall are obviously desirable and these will depend somewhat on the geometry of the scrubber duct and the gas velocities. For example, a nozzle producing a conically shaped jet and centrally located within the duct would be most advantageous to give adequate coverage across a circular duct. In some cases when gas ducts of large diameter are required, maximum effectiveness can be obtained by two or more jets uniformly spaced within the duct. The duct is, of course, essentially unobstructed as any sort of packing medium is wholly unnecessary.

It will be apparent that liquids other than water can be used for the countercurrent jet scrubber; i.e. in petroleum refining, where process streams are predominantly anhydrous, liquid hydrocarbons could be advantageously used. For obvious economic reasons, water is the preferred liquid for the vast majority of potential applications. It will also be obvious that for some uses it will be advantageous to add alkalis, acids, or other materials to the scrubbing liquid as desired to aid in removal of select materials.

EXAMPLE I

Figure 1:
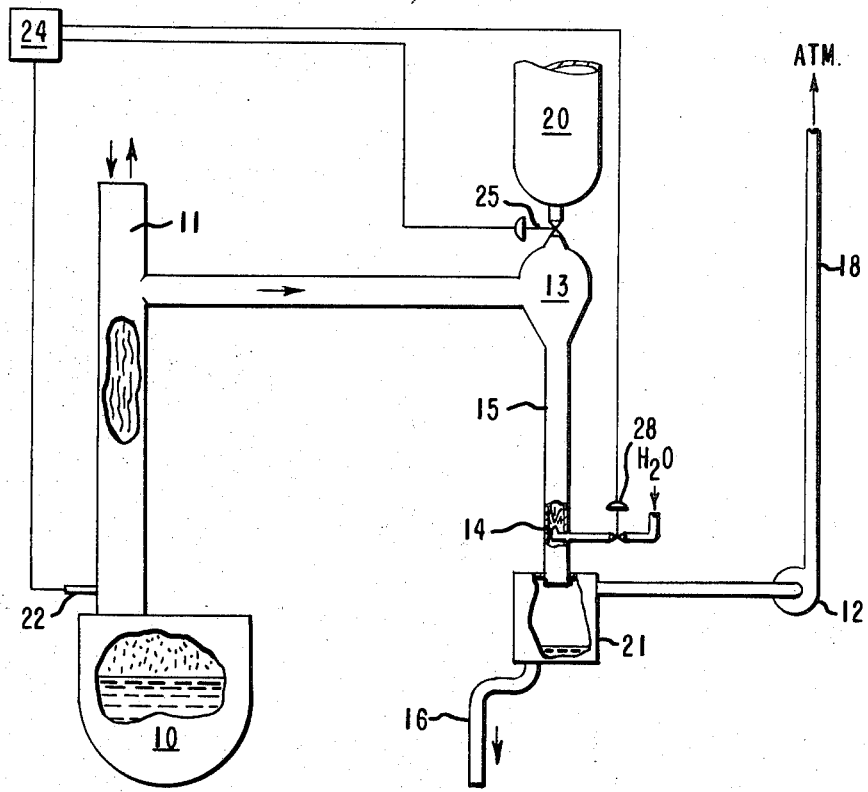
FIG. 1 shows a schematic illustration of a system for removal of particulate material from the gaseous product resulting from the sulfuric acid attack of ilmenite ore, i.e., in the production of titanium dioxide.

In an ilmenite ore attack system of the type shown in FIG. 1, the scrubber 13, measuring 5 feet in diameter, is provided with a 30 inch diameter outlet pipe 15. Positioned in the pipe so as to direct water upwardly and countercurrent to the gas flow, the velocity of which is 2,850 feet/minute, is a jet nozzle 14 having an orifice designed to disperse the water in a 20° wide cone into the throat. The reverse-jet is designed to give 8 ½ inches of water pressure drop at a jet horsepower/ft$^2$ of 2.8. The pressure drop induced by the countercurrent jet as it reverses direction enables a reduction in gas flow to 27,500 cubic feet per minute from its normal value of 40,000 cubic feet per minute during the ore addition cycle, despite the large outlet pipe diameter 15 which is required for adequate quenching, thus obviating the need for a larger blower and motor. Greatly improved dust removal efficiencies are thereby achieved. Actual measurements of ore dust removal by air sampling with Gelman holders and Type A fiberglass filters just before the scrubber and at the blower stack show removal efficiencies of 92–98%. Particle size analysis of aqueous suspensions of the collected ore dust by the Coulter Counter show that the material entering the scrubber has a median diameter by weight of 1.1 microns and that exiting to the stack is 0.8 micron; thus indicating efficient removal of material in the particle size range which is difficult to remove efficiently by previous methods. Over a sustained operating period no instance of a bothersome "rain" of acid mist is observed in the area near the ore attack building, even during the attack cycle. This absence of "rain" is attributed to better contacting of the warm saturated gas and cool water at the reverse-jet where temperature equilibrium between the two phases is reached ahead of the liquid separator. Water droplets formed as the gas is cooled at the jet are removed at the water separator rather than being condensed later on the wall of the exit stack from which they are blown to the atmosphere by the high velocity gas. The speed with which the gas and liquid reach thermal equilibrium supports the usefulness of the reverse jet process as a means for liquid-gas contacting or gas absorption.

By way of comparison, an identical system is utilized except that the water jet is moved to a position in the uppermost portion of the scrubber so as to direct the water cocurrently with the gas. In this case the particulate scrubbing is inefficient, ranging from 55–85%. During the period of reaction when the quench water is falling from tank 20, the flow tends to partially block outlet pipe 15, reducing capacity of the system to 30,000 cubic feet per minute from its normal value of 40,000 cubic feet per minute. It is not uncommon that capacity is on occasion exceeded with the result that excess steam and particulates are directly vented to the atmosphere from the attack vessel, hence giving a "rain" of acidic water droplets and a discharge of ore particles in the vicinity around the ore attack building.

It will be noted that with the co-current system used for comparison, increasing the size of the pipe 15 of the scrubber 13 to increase capacity during the quench part of the cycle would undesirably increase the flow of air when the quench is off to a point where the available blower motor is overloaded, and also increase the volume of air to be scrubbed during the ore addition. Installation of a higher capacity blower not only would be expensive but would not alleviate the latter problem. Other suggested solutions such as the addition of packed scrubbing towers would entail even more substantial additional investments and operating costs.

EXAMPLE II

This example illustrates the use of the reverse jet for the purpose of removing one select gas, in this case $SO_2$, from a mixture of gases by absorption into a suitable liquid, in this case dilute aqueous NaOH solution of sufficient alkalinity, to maintain spent water at greater than pH 8.0 after its having absorbed approximately 300 ppm of $SO_2$ from the flowing gas stream. The gas to be treated is air to which there is added known quantities of $SO_2$. The gas velocity is 45 feet per second. The reverse jet arrangement is the same as that described for ilmenite attack in FIGS. 1 and 2.

In this type of absorption, a chemical reaction takes place between the $SO_2$ and NaOH to form soluble $Na_2SO_3$ which effectively traps $SO_2$ in the water.

To test the efficiency of the absorption system, the concentration of $SO_2$ in the gas was increased from zero up to 290 mole ppm over a 30 minute period. During this period, the water being pumped to the reverse jet was maintained at a pH above 8.0 by adding more concentrated NaOH solution to the pump suction. Gas samples from the gas inlet and gas outlet streams were taken at intervals during the test period to measure $SO_2$ concentrations at those two locations.

The pressure drop across the reverse jet was 8 ½ inches equivalent to 2.8 HP/square foot during the test.

Figure 2:
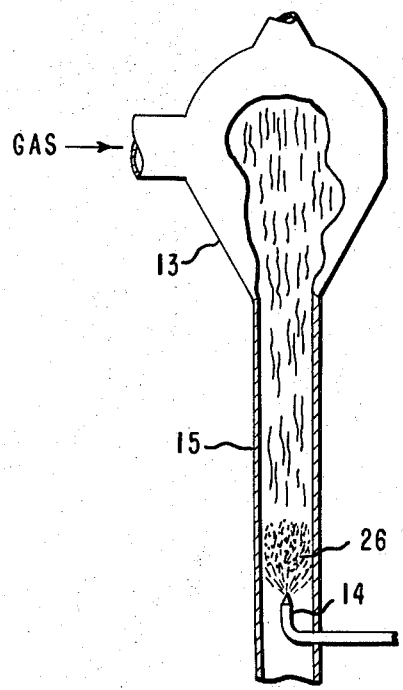
FIG. 2 is an enlarged schematic illustration of the reverse-jet scrubber arrangement of FIG. 1.

The table below shows $SO_2$ concentrations in the gas streams entering and leaving the scrubber of FIG. 2 during the test. All $SO_2$ measurements were made using MSA detector tubes No. 92623.

| TIME MINUTES | INLET $SO_2$ PPM | OUTLET $SO_2$ PPM |
|---|---|---|
| 0:00 | 60 | 12 |
| 2:30 | | 9 |
| 5:00 | | 8 |
| 8:00 | | 11 |
| 8:30 | 85 | |
| 13:00 | | 0 |
| 13:15 | 122 | |
| 17:00 | | 0 |
| 17:30 | 175 | |
| 21:00 | | 8 |
| 21:30 | 290 | |
| 24:00 | | 16 |

When plotted, the data shows that the reverse jet absorbed 80% of the $SO_2$ when the inlet concentration was 60 ppm and this efficiency increased to 97.2% with an inlet concentration of 290 ppm $SO_2$. The above test does not propose a limit on the range of absorption, but serves to illustrate use of the reverse jet as an absorber.

What is claimed is:

1. An improved method for effecting contact of a gas with a liquid by contacting the gas flowing through a conduit by at least one jet of liquid directed countercurrently to the gas, the velocity of liquid from the jet being sufficient to furnish greater than 1.0 jet horsepower per square foot of cross-sectional area of said conduit and the average velocity of the gas through said conduit being maintained at a value of at least 1,000 feet per minute and at least at the flooding velocity.

2. The method of claim 1 for scrubbing of entrained material from a gas.

3. The method of claim 1 wherein the liquid is water.

4. The method of claim 1 wherein the gas contains ilmenite and sulfuric acid mist derived from the reaction of ilmenite ore with sulfuric acid.

5. The method of claim 1 wherein the gas velocity is at least 1,500 feet per minute and the velocity of liquid flowing from the jet is at least 1.5 jet horsepower per square foot of cross-sectional area of said conduit.

6. The method of claim 1 for absorption of a material from a gas.

7. The method of claim 6 in which the material to be absorbed is $SO_2$.

* * * * *